United States Patent [19]

Driscoll

[11] Patent Number: 5,343,474
[45] Date of Patent: Aug. 30, 1994

[54] SLOTTED ARBITRATION WITHOUT TIME JITTER IN A TABLE DRIVEN PROTOCOL

[75] Inventor: Kevin R. Driscoll, Maple Grove, Minn.

[73] Assignee: Honeywell Inc., Minneapolis, Minn.

[21] Appl. No.: 39,873

[22] Filed: Mar. 31, 1993

[51] Int. Cl.⁵ ............................................. H04L 12/40
[52] U.S. Cl. ................................. 370/85.3; 370/85.6; 370/85.7
[58] Field of Search ................. 370/79, 80, 85.2, 85.3, 370/85.6, 85.7, 95.1, 85.3; 340/825.51

[56] References Cited

U.S. PATENT DOCUMENTS

| | | | |
|---|---|---|---|
| 4,161,786 | 7/1979 | Hopkins et al. | 370/85.7 |
| 4,860,006 | 8/1989 | Barall | 370/85.3 |
| 5,081,623 | 1/1992 | Ainscow | 370/85.7 |

Primary Examiner—Benedict V. Safourek
Attorney, Agent, or Firm—D. E. Jepsen; R. E. Champion

[57] ABSTRACT

A media access protocol provides a fixed frame length and limited arbitration among certain predetermined users by providing limited arbitration during certain fixed time slots of a table driven proportional access system. For the remaining fixed time slots, only one user per fixed time slot is allowed.

2 Claims, 3 Drawing Sheets

Fig.1 PRIOR ART

TDMA: 1 | 2 | 3 | 4 | 5 | 6 | 7 | 8

TDPA: 7 | 3 | 1 | 5 | 8 | 5 | 4 | 4

Fig.2 PRIOR ART

Slotted: 1 | 2 | 3 | 4 | 5 | 6 | 7 | 8

Slot Timing Variation: 1 | 2 | 3 | 5 | 7 | 8

SLOTTED ARBITRATION WITHOUT TIME JITTER IN A TABLE DRIVEN PROTOCOL

BACKGROUND OF THE INVENTION

1. Field of the Invention

The present invention is related to media access protocol systems and more particularly to a protocol system which combines features of a table driven proportional access system and a slotted arbitration system.

2. Description of the Prior Art

The prior art media access protocols have included a strict time division multiple access protocol wherein each user is allocated a fixed equal period of time during which to transmit on the common bus, and table driven proportional access protocols wherein a specific time period is allocated for each user from a table which controls both the order and length of time period which each user is allowed to transmit on the common data bus.

The strict time division multiple access system provides a functioning access to a common bus by multiple users, but causes inefficiencies when various users do not use the time during their allocated access period. This inefficiency may not be a problem for slower systems or those which have a relatively small number of users, however this has become a problem when the time response for specific users becomes critical, or system capacity is approached.

The table driven proportional access system provides some improvement in that for a given node, the table may determine an arbitrary size and order for the transmission times. While this does at least allow some flexibility in the order of the transmissions and the duration of each transmission; the specific transmission allocations, once selected, are not changeable. In addition there is no provision for allowing a user other than the specific, table-designated user access to the bus during any given specific transmission period.

An alternative method of allocating time periods for multiple access to the bus system is a slotted arbitration system wherein the designated users are simply allocated a priority and attempt, and are granted, access to the system for each time period on a strict priority basis. This system does provide certain time efficiencies in that potential users who do not attempt access during a given time frame do not use up an allocated time slot. However, when the number of users varies from frame to frame the total frame length will vary causing a timing variation, or time jitter, from one frame to the next.

SUMMARY OF THE INVENTION

In accordance with the principals of the present invention a media access protocol is provided which combines the fixed time slot length of the table driven proportional access system with certain predetermined slots therein having a limited slotted arbitration capability.

For certain users of the common digital bus there will be a simple assignment of a specific time period to a specific user. For certain other predetermined time periods of the total frame time, there is a slotted arbitration among two or more assigned users which occurs during a fixed time period. This time period is of sufficient length to allow the longest of the assigned prioritized users to complete its transmission plus a number of delta times as required to accomplished the arbitration among the competing users within the specific time period.

This combination provides for a system which allows certain of the competing users access during an arbitrated time period, while keeping the overall total time for access by all users to a fixed time period thereby eliminating the time jitter ordinarily associated with a slotted timing variation. The advantages of the inventive system will be understood more fully from the following description in combination with reference to the accompanying drawings.

BRIEF DESCRIPTION OF THE DRAWINGS

FIG. 1 is a timing diagram illustrating the user access time segments within a sample frame for the prior art Time Division Multiple Access (TDMA) and Table Driven Proportional Access systems (TDPA);

FIG. 2 is a timing diagram illustrating the time slots allocated within a sample frame to the various users for a prior art slotted arbitration system;

DESCRIPTION OF THE PREFERRED EMBODIMENT

Figure 3:
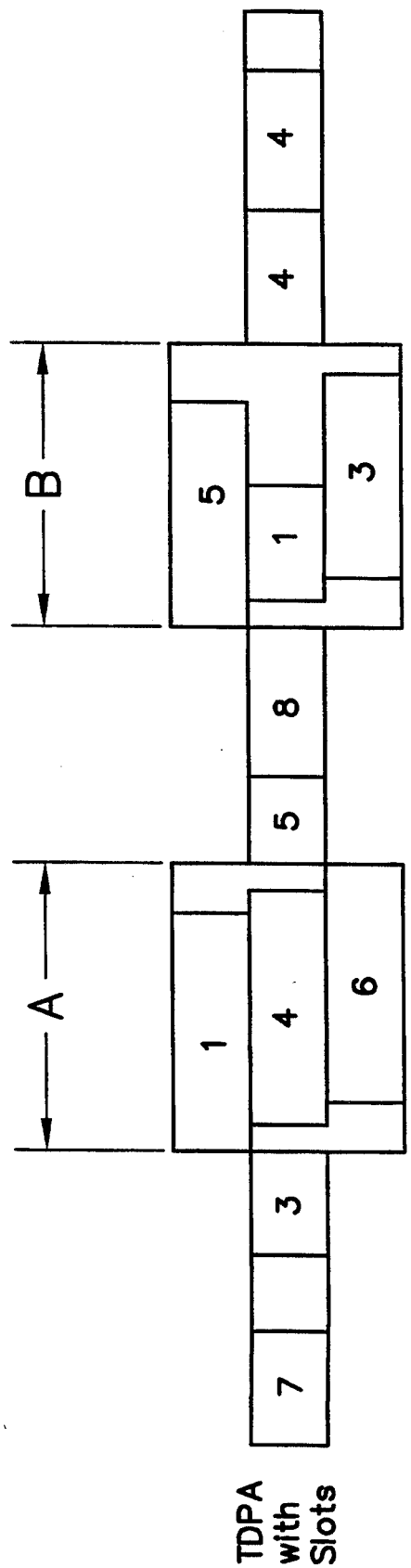
FIG. 3 is a timing diagram illustrating the user access time segments within a sample time frame of the present invention.

Shown in FIG. 1 is an illustration of the time division multiple access protocol (TDMA) which allocates a fixed, specific length, equal length, time of access to each of the eight designated users. As illustrated, the order of use of the eight users remains constant in the numerical sequence shown and the amount of time allocated to each of the specific users is equal for this prior art protocol system.

Also illustrated in FIG. 1, is a table driven proportional access (TDPA) protocol system wherein both the order of access and the specific length of time of access for any given user may be varied according to a predetermined table. At each communication node, the specific table dictates which user can transmit and at what times and for how long. While this table driven protocol improves the efficiency of the transmission system by allowing arbitrary length and order of transmissions, it does not allow for arbitrated transmission among competing users within a given designated time slot.

A strict priority arbitration system is illustrated in FIG. 2. In the top sample time frame of FIG. 2, there is illustrated a system wherein users 1-8 are allowed access to the communication media in descending order priority. The lower sample time frame of FIG. 2 illustrates a particular instance where users 4 and 6 have not attempted any transmission and therefore have deleted their time allocation for transmission. In addition, the transmission time length for user 1 has decreased while the transmission time length for user 8 has increased. These variations cause a variation in timing, or jitter, from one frame to the next.

As illustrated, the total transmission or frame time for a given cycle is therefore decreased allowing for increased efficiency for the total time available. This does however prevent the use of a synchronized system in that for each given cycle, the total frame time will be different depending on how many of the prioritized users actually utilize an access time period in the total frame time. For example, as shown in the bottom sample frame of FIG. 2, the total frame time is substantially less when users 4 and 6 do not utilize their allocated access time.

While this results in an overall increase in efficiency by not allocating time to users who do not require access, a significant disadvantage results from a variation in total frame time from one cycle to the next, which may not be determined in advance.

In the prior art protocol systems of FIG. 1, the allocated time for a specific user will remain allocated even if the user does not access the bus during that allocated specific time.

The present invention augments the TDPA by allowing slotted arbitration in certain predetermined allocated time periods. An entry into the table of the present invention, which controls the media for a specific duration of time, may assign a single transmitter, as in the prior art TDPA, or may assign a set of transmitters, each with a predetermined assigned priority.

Within the predetermined time slot, the transmitter with the highest priority starts transmitting immediately at the beginning of the time period controlled by the table entry. If the transmitter with the highest priority fails to transmit, the second highest priority transmitter is allowed to transmit after a predetermined delta time has elapsed. If in turn the second transmitter fails to transmit, the third priority transmitter is allowed to transmit after two delta times have elapsed from the beginning of the controlled time period.

The delta time is fixed at a duration which is sufficient for each succeeding transmitter to perceive that the next highest priority transmitters have not transmitted. The total time slot controlled by the table entry is selected to be long enough to accommodate the longest of the possible messages to be transmitted by the given set of transmitters, plus an additional N - 1 times the delta time, where N is the number of transmitters in the set.

This method allows priority arbitration for exclusive use of the media without changing the timing (i.e., the start of the transmission time) for the next transmitter. Neither of the discussed prior art systems allow for any arbitration within the allocated time slots. Those prior art slotted protocols which do allow for arbitration do not have a fixed start time or timing mechanism for the start the next frame.

As illustrated in FIG. 3, certain of the users would be allocated specific time slots such as those illustrated as users 7, 3, 5, 8 and 4. However, within the time slots labeled A and B of FIG. 3, there is allowed a limited arbitration among the potential users shown.

For example, within time slot A user 1 will have first priority and begin transmitting at the exact start of time slot A. User 4 would wait a single delta time to determine whether or not user 1 has begun transmitting. If user 1 has not begun transmitting after the expiration of the predetermined delta time, then user 4 begins transmission for time slot A. In a similar fashion, user 6 will wait two delta times to determine whether or not either user 1 or user 4 has begun transmission. If neither of these higher priority users have started transmission after the two delta time periods, then user 6 will begin transmitting for the remainder of time slot A.

Figure 4:
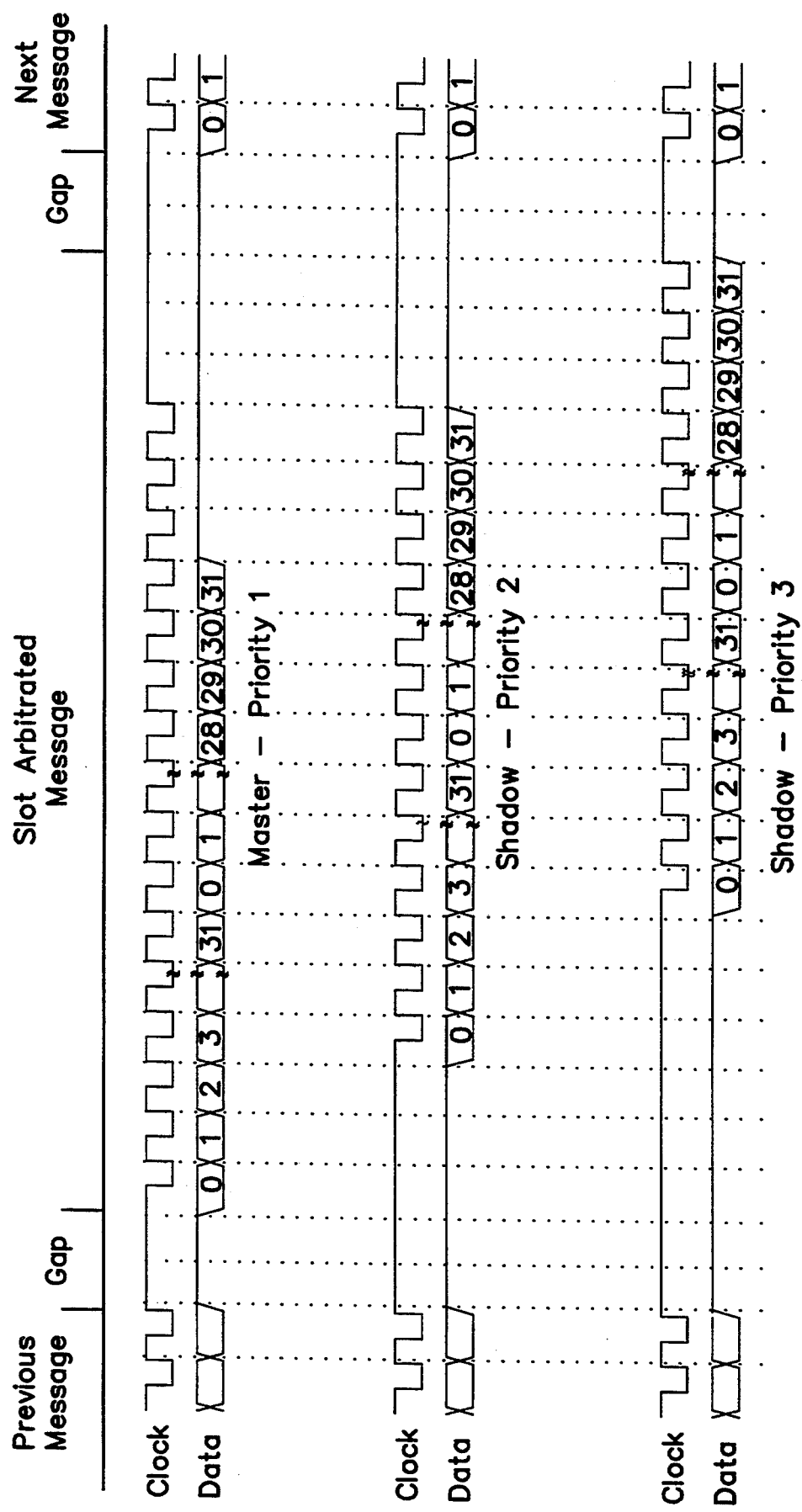
FIG. 4 is a timing diagram illustrating in further detail the slotted arbitration portion of the system of present invention.

This slotted arbitration is illustrated further in FIG. 4 wherein there are shown a master user having priority one and two shadow users having priorities two and three. For the example of FIG. 3 user 1 would be the master, user 4 would be the shadow user having priority two, and user 6 would be the second shadow user having priority 3 as illustrated in FIG. 4. The competing prioritized users need not have the same designated period of use, as illustrated in time slot B of FIG. 3.

There are numerous uses for the arbitration which is allowed within the designated time slots of the illustrated protocol process system. For example, in time slot A of FIG. 3 the competing users may be duplicate or redundant versions of the same data. In this fashion, a selected one of several duplicate signals may be selected to be transmitted over the communications bus.

As shown in FIG. 3, the overall time for the total frame remains constant with a very small portion of time being utilized within time slots A and B to accomplish the arbitration. This allows the overall cycle time to be fixed and repeatable while at the same time allowing a limited amount of arbitration within slots A and B, without causing the time frame jitter of prior art, strictly arbitrated priority systems.

Time slots A and B are of a fixed length which does not change regardless of which of the competing users actually uses the allocated time or how much of the allocated time is used. For example, time slot B would run for the entire fixed allocated time shown even if user 1 doesn't require the entire time. By holding the annunciation of reception of message until the end of the window, no time jitter is seen by the receiver. There are, therefore, no observable timing variations from one frame to the next, and no jitter results from different ones of the arbitrated users transmitting during successive time frames.

The prior art and inventive system have been illustrated with eight users solely for purposes of illustration. In a particular actual system, the number of users would be as required with a particular application, and may in some cases total several hundred. In a similar fashion, the arbitration within time slots A and B has been illustrated using three potential users for each time slot. In a particular application there may be any number of potential users greater than two, with the only limit being the number of delta times which would accrue in order to accomplish the desired arbitration period.

It will be recognized that as an alternative, when the number of arbiters is large for a particular application, other prior art arbitration protocols may be used within the fixed, arbitrated time slots to accomplish the arbitration, while retaining the benefits of the fixed time slot.

Those skilled in the art will recognize that many specific implementations are possible without departing from the scope of the claimed invention.

What is claimed is:

1. A method for allocating access to a communications bus among a plurality of users for repeatable time frames comprising the steps of:

dividing each of said time frames into a predetermined number of time slots, each of said times slots having a fixed, predetermined duration, for designated ones of said predetermined time slots, assigning at least two of said users to each of said designated time slots, assigning a priority to each of said at least two users, thereby creating prioritized users; and allowing each of said prioritized users, in the order of priority, access to said communications bus only if a predetermined time has elapsed, and none of said prioritized users having a higher priority is transmitting.

2. The method of claim 1 further comprising the step of:

for each of said users not assigned to one of said designated time slots, allowing access to said communications bus during an assigned one of said time slots other than said designated time slots.

* * * * *